United States Patent
Thomas et al.

(10) Patent No.: US 9,954,933 B2
(45) Date of Patent: Apr. 24, 2018

(54) SCHEDULED VIRTUAL DESKTOPS

(71) Applicant: Amazon Technologies, Inc., Seattle, WA (US)

(72) Inventors: Nathan Bartholomew Thomas, Seattle, WA (US); Eugene Michael Farrell, Sammamish, WA (US); Erik Jonathon Tellvik, Renton, WA (US); Deepak Suryanarayanan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 14/502,041

(22) Filed: Sep. 30, 2014

(65) Prior Publication Data
US 2016/0094622 A1  Mar. 31, 2016

(51) Int. Cl.
| | | |
|---|---|---|
| *G06F 15/16* | (2006.01) | |
| *H04L 29/08* | (2006.01) | |
| *H04L 12/24* | (2006.01) | |
| *G06F 9/48* | (2006.01) | |
| *G06F 9/50* | (2006.01) | |

(52) U.S. Cl.
CPC .............. *H04L 67/10* (2013.01); *G06F 9/485* (2013.01); *G06F 9/5077* (2013.01); *H04L 41/22* (2013.01)

(58) Field of Classification Search
CPC ......... H04L 67/10; H04L 41/22; H04L 12/24; H04L 29/08; G06F 9/5077; G06F 9/485
USPC ....................................................... 709/203
See application file for complete search history.

(56) References Cited

U.S. PATENT DOCUMENTS

| | | | | |
|---|---|---|---|---|
| 8,281,377 | B1* | 10/2012 | Snow | H04N 21/41407 726/11 |
| 2007/0192491 | A1* | 8/2007 | Saigo | H04L 67/36 709/226 |
| 2008/0155100 | A1* | 6/2008 | Ahmed | G06F 9/5011 709/226 |
| 2009/0006537 | A1* | 1/2009 | Palekar | G06F 9/5027 709/203 |
| 2010/0153946 | A1* | 6/2010 | Bhaskar | G06F 9/455 718/1 |
| 2010/0211663 | A1* | 8/2010 | Barboy | G06F 17/30233 709/223 |
| 2010/0332643 | A1* | 12/2010 | Benari | G06F 9/5077 709/224 |
| 2012/0144178 | A1 | 6/2012 | Iyigun et al. | |
| 2013/0073703 | A1* | 3/2013 | Das | H04L 67/10 709/223 |

(Continued)

OTHER PUBLICATIONS

International Search Report and Written Opinion, International Application No. PCT/US2015/052260, dated Jan. 5, 2016, 10 pages.

(Continued)

*Primary Examiner* — Tauqir Hussain
(74) *Attorney, Agent, or Firm* — Klarquist Sparkman, LLP

(57) ABSTRACT

A schedule may be determined. The schedule may include a shutdown time and a startup time. At the shutdown time, user data for a first virtual desktop instance for a virtual desktop may be saved and the first virtual desktop instance may be shut down. At the startup time, a second virtual desktop instance for the virtual desktop may be started up with the saved user data. The shutdown and startup of a virtual desktop instance may be based on rules or logic for an individual or an organization.

18 Claims, 10 Drawing Sheets

(56) References Cited

U.S. PATENT DOCUMENTS

2014/0280898 A1* 9/2014 Voit ........................ H04L 61/00
709/224
2015/0356773 A1* 12/2015 Kumar ................ G06F 9/45558
345/520

OTHER PUBLICATIONS

International Application No. PCT/US2015/052260, International Preliminary Reprot on Patentability, 7 pages, dated Apr. 13, 2017.

* cited by examiner

SCHEDULED VIRTUAL DESKTOPS

BACKGROUND

Cloud computing is the use of computing resources (hardware and software) that are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or the ability to adapt rapidly to changing computing resource needs.

A virtual desktop environment may be hosted on the cloud or on a server at an organization site. A desktop computing environment on the cloud (hereinafter referred to as a "cloud desktop") provides a virtual desktop environment running on servers in the cloud that a user can connect to from a personal computing device. A desktop computing environment at an organization site (hereinafter referred to as an "on-premise virtual desktop") provides a virtual desktop environment running on servers owned and/or operated by the organization or user associated with the organization. Many virtual desktops provide constant availability, where a virtual desktop instance continually runs on one or more servers in the cloud or on one or more organization servers. However, leaving a virtual desktop instance running continually may consume significant computing resources, even when the virtual desktop instance is not in use, i.e., a user is not using their virtual desktop.

DETAILED DESCRIPTION

Overview

Figure 1:
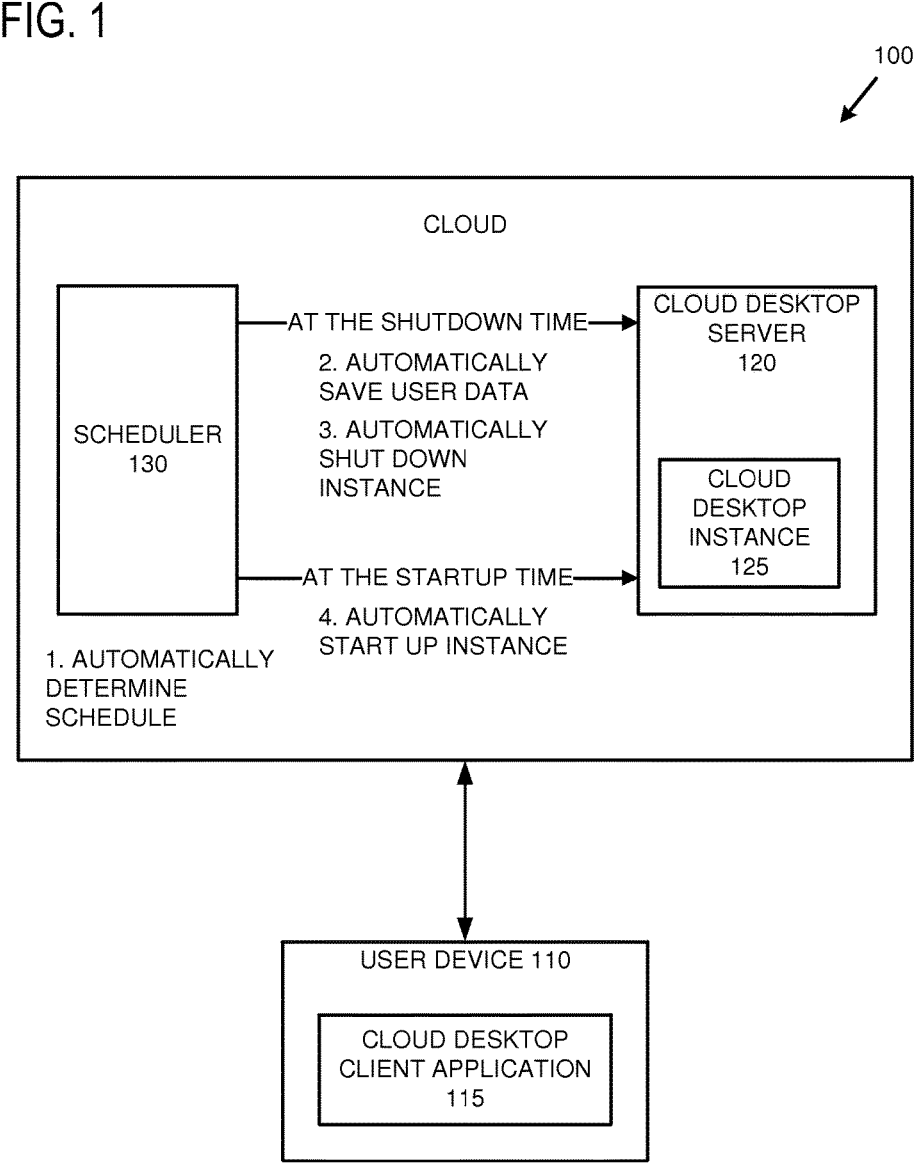
FIG. 1 is a computing system diagram of a cloud desktop environment.

The following description is directed to techniques and solutions for managing the resource consumption of a virtual desktop. For example, a virtual desktop instance may be automatically shut down when a user is not using the virtual desktop and a virtual desktop instance may be started when the user uses the virtual desktop. The automatic shutdown and startup of a virtual desktop instance may be based on rules or logic for an individual or an organization. As used herein, the term "user device" refers to any type of computing device (e.g., a server computer, desktop computer, laptop, tablet, mobile phone, or another type of computing device) that is capable of hosting a virtual desktop session.

Virtual desktops may run on servers in the cloud. For example, a virtual desktop instance may run on one or more servers in the cloud, while a virtual desktop session runs on a user device. The user interacts with a virtual desktop on the user device, where the user interactions on the user device are applied to the virtual desktop instance running on the cloud. When a user ends the virtual desktop session, e.g., by shutting off their user device, the virtual desktop instance may still be running on the cloud. The user may not revisit the virtual desktop instance (e.g., login to the desktop or otherwise use resources of the desktop) for hours, during which the virtual desktop instance continues to run, consuming resources, potentially at a cost to the user. In order to reduce the resources being consumed by the virtual desktop, the virtual desktop instance may be shut down when, e.g., the user has finished their virtual desktop session and started up again before the user begins a new virtual desktop session.

A user may manually shut down a virtual desktop instance when they are finished with their virtual desktop session (e.g., by entering a command to shut down the virtual desktop instance) and manually start a new virtual desktop instance when they begin a new session. However, the process of shutting down a virtual desktop instance and starting a new virtual desktop instance may take several minutes (e.g., due to rebuilding the virtual desktop instance from a user's virtual desktop image), time the user may not want to wait for.

An automatic process for shutting down and starting up a virtual desktop instance may be provided, allowing the user to set rules and policies manually, or obtaining rules and policies dynamically. This would allow the virtual desktop to be shut down and started up at a predetermined time automatically.

In a particular embodiment, a schedule to shut down and start up a virtual desktop instance may be determined. At a predetermined time for the shutting down (i.e., shutdown time), the user data for a first virtual desktop instance may be saved and the first virtual desktop instance may be shut down. At a predetermined time for the starting up (i.e., startup time), a second virtual desktop instance may be started with the saved user data.

In another embodiment, a schedule to shut down and start up a virtual desktop instance may be determined. At a shutdown time, the memory, central processing unit (CPU) and disk state of a virtual desktop instance may be saved and the virtual desktop instance may be shut down. At a startup time, a second virtual desktop instance may be started with the saved memory, CPU and disk state of the previous virtual desktop instance (i.e., first virtual desktop instance) loaded at the second virtual desktop instance.

In another embodiment, a schedule to reduce and increase computing resources (e.g., CPU, graphics processing unit (GPU), memory, network bandwidth, etc.) for a virtual desktop instance may be determined. At a first predetermined time, computing resources may be reduced for the virtual desktop instance (i.e., the virtual desktop instance is run in a reduced state). At a second predetermined time, the resources may be increased for the virtual desktop instance (i.e., the virtual desktop instance is run in a normal or increased state).

Thus, a schedule for the virtual desktop may be set to manage computing resources for virtual desktop instances, in so doing consuming fewer computing resources for the virtual desktop.

Cloud Desktop

FIG. 1 is a computing system diagram of a cloud desktop environment 100. A user may launch a cloud desktop session via, e.g., a cloud desktop client application 115 on a user device 110. The cloud desktop client application 115 connects the user device 110 to a cloud desktop instance running on one or more cloud desktop servers 120. The cloud desktop client application 115 may mimic the appearance of an operating system environment so that it appears to the user that the user device 110 is running the cloud desktop instance 125 locally on the user device 110, where in fact it is running on the one or more cloud desktop servers 120.

In the previous example, a cloud desktop client application 115 is described. However, a cloud desktop client application 115 need not be used to access a cloud desktop instance. For example, the cloud desktop instance may be viewed on a web browser, the browser displaying the contents of the cloud desktop instance.

The cloud desktop instance 125 is hosted on one or more cloud desktop servers 120 in a data center, the one or more cloud desktop servers 120 providing an instance of the user's cloud desktop. The one or more cloud desktop servers 120 receives input from the user on the user device 110 via the cloud desktop client application 115 and operates on the cloud desktop instance 125, translating the inputs on the user device 110 to inputs to the cloud desktop instance 125. For example, if the user clicks on an icon on the cloud desktop client application 115 running on the user device 110, the corresponding application on the one or more cloud desktop servers 120 will be executed on the cloud desktop instance 125. Generally, a cloud desktop instance 125 may include a virtual machine that is instantiated to provide a user with access to a computing resource, or compute node, such as a virtual desktop. Alternatively, a cloud desktop instance 125 may be created on the one or more cloud desktop servers 120 without use of a virtual machine.

A cloud desktop instance 125 may include a desktop environment. The desktop environment may include any type of environment representing a virtual desktop. For example, the desktop environment may include an interface for interacting with files and/or applications that are stored for the cloud desktop. In some cases, the desktop environment may include shortcuts for accessing data and/or applications that are included or hosted by another cloud desktop instance. Further, in some cases, the desktop environment may provide additional or alternative interfaces for accessing files and applications besides a desktop. For example, the desktop environment may include or be a file manager. In some cases, regardless of the underlying operating system and/or hardware, the desktop environment may present a particular look and feel. For example, the desktop environment may be configured to emulate a Windows desktop, a Linux desktop, or an iOS desktop. In other cases, the cloud desktop instance 125 may be part of a virtual machine computing resource selected by a user. In such cases, the desktop environment may be the desktop environment of the selected operating system for the virtual machine computing resource (e.g., Windows, Linux, etc.).

A user may close the cloud desktop client application 115 or shutdown their user device 110. However, the cloud desktop instance 125 may continue to run on the one or more cloud desktop servers 120. Thus, a scheduler 130 may be used to automatically determine a schedule for shutting down and starting up a cloud desktop instance 125 running on the one or more cloud desktop servers 120. At a time determined by the scheduler 130 (i.e., shutdown time), the user data for the cloud desktop instance 125 may be saved, and the cloud desktop instance 125 may automatically be shut down. At a different time determined by the scheduler 130 (i.e., startup time), the one or more cloud desktop servers 120 may start up a new cloud desktop instance 125 (or reconnect the user to the previous cloud desktop instance).

As described herein, the virtual desktop is hosted in a cloud-based environment. However, the virtual desktop may also be hosted using, e.g., an on-premises solution. For example, the virtual desktop may be hosted on one or more servers owned and/or operated by the organization or user associated with the organization. For example, an organization may operate one or more servers to provide virtual desktops to its employees. These virtual desktops may be scheduled to more efficiently manage resource consumption by the virtual desktops.

Scheduling a Cloud Desktop

Figure 2:
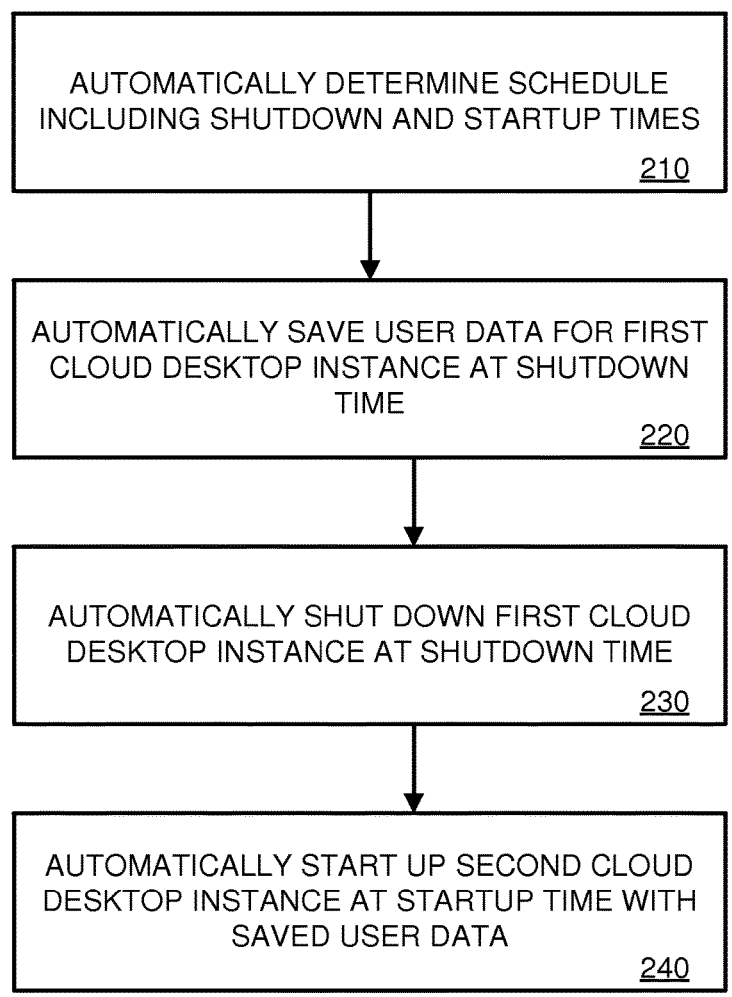
FIG. 2 is a flowchart showing an example method of scheduling a cloud desktop.

A mechanism may be provided to allow cloud desktops to be scheduled to conserve computing resources by, e.g., shutting down a cloud desktop instance at a regular time each day, and starting up a cloud desktop instance at another time each day. FIG. 2 is a flowchart showing an example method of scheduling a cloud desktop. At 210, a schedule is automatically determined. The schedule may include, e.g., a shutdown time and a startup time. For example, the shutdown time may be the time the user associated with the cloud desktop finishes work or normally shuts off their user device. The startup time may be when the user starts work or turns on their user device. The schedule may be set on the user device or on a cloud desktop server.

For example, a user may specify the shutdown and startup times as their regular working hours (e.g., a cloud desktop instance is shut down at the end of the work day and a cloud desktop instance is started up at the beginning of the work day). In addition, an administrator associated with the cloud desktop may also specify the shutdown and startup times. Alternatively, times at which to set the shutdown and startup times may be determined. For example, if it is determined that the user doesn't use the cloud desktop in the middle of the night, e.g., from 2:00 AM to 6:00 AM, the shutdown and startup times may be set based on the determination.

Further, the determination may be based on rules for the user (e.g., based on geography), or may be based on usage patterns of the user (or a group of users). For example, a usage pattern may be the times at which the user is likely to use their cloud desktop. The usage pattern may also be times at which the user is likely away from their office or desk, or locations where the user is unlikely to access their cloud desktop. Alternately, the usage pattern may be any determination of when the user may and may not be using the cloud desktop instance. The usage pattern may also be an application usage pattern. For example, applications (e.g., graphics intensive applications) may need to run for a certain period or with a certain amount of computing resources. Thus, by setting shutdown and startup times for the application (or decreasing and increasing resources for the application) based on an application usage pattern, the cloud desktop may be used more efficiently during those periods.

The shutdown time may also be determined by an inactivity timer. For example, if a user is not using the cloud desktop associated with the user for a specified time, the cloud desktop may automatically shut down. Alternatively, the inactivity timer may be specified for an organization.

Further, the shutdown and startup times may be determined by an organizational policy. For example, if an organization would like to shut down and start up the cloud desktop instances for that organization at predetermined times, the predetermined times may be applied to the user's cloud desktop instances.

The shutdown and startup times may also be determined by the calendar activities for a user. For example, if a user uses a calendar program, the calendar program may be used to determine when the user is out of the office or otherwise unavailable. In addition, the calendar program may indicate when a user needs the cloud desktop, e.g., if the user has a meeting scheduled, and the scheduler can ensure that a cloud desktop instance is running at that time.

The shutdown and startup times may be determined by the location of the user. For example, the shutdown and startup times may be determined according to a user's location as indicated by a satellite positioning system (e.g., Global Positioning System (GPS)) or other positioning system. As the user approaches a user device running a cloud desktop client application (e.g., as part of a commute or other type of travel), the startup time may be set so that a cloud desktop instance is running when the user reaches the user device. In addition, any other means of determining shut down and start up time for a desktop instance may be used to set the shutdown and startup times.

At 220, user data for a first cloud desktop instance for the cloud desktop is automatically saved at the shutdown time, and, at 230, the first cloud desktop instance for the cloud desktop is automatically shut down at the shutdown time. At this time, less computing resources, or no more computing resources, are consumed for the cloud desktop instance. When the cloud desktop instance is shut down, some or all of the computing resources for the cloud desktop instance may be reallocated to other cloud desktop instances or other programs running on the cloud.

At 240, a second cloud desktop instance for the cloud desktop is automatically started at the startup time with the saved user data. The startup time may be a time before, e.g., the user starts up or logs into their user device, so that the second cloud desktop instance is available when the user starts up or logs into their user device. The second cloud desktop instance may be a newly built cloud desktop instance or a loaded cloud desktop instance image, or may be obtained from a currently running cloud desktop instance from a desktop pool. For example, if a currently running cloud desktop instance is obtained, a user volume containing the user data may be attached to the currently running cloud desktop instance.

Thus, since a cloud desktop instance is shut down when the user is not using the cloud desktop and a cloud desktop instance is started up when the user is using the cloud desktop, the use of computing resources may be reduced.

Figure 3:
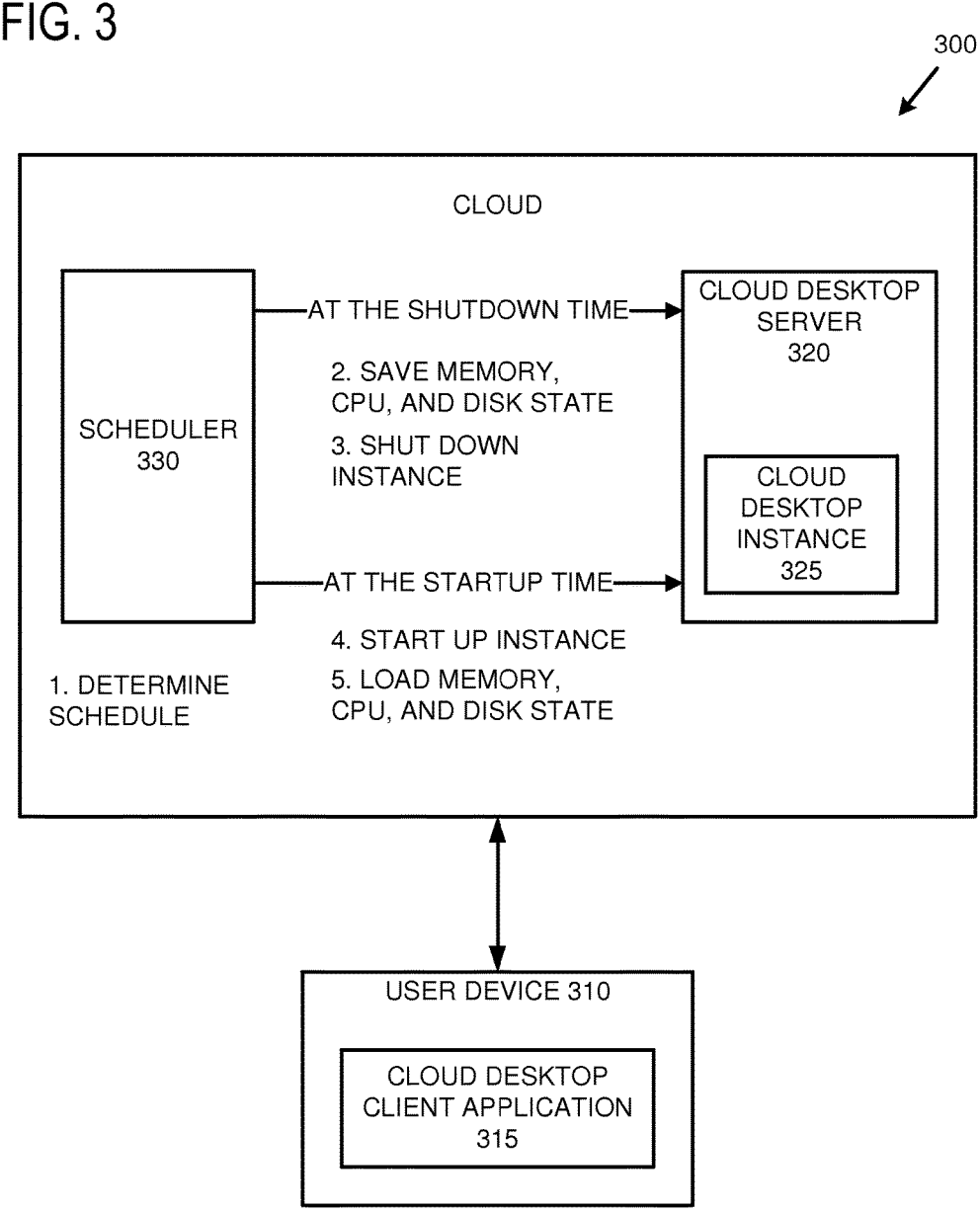
FIG. 3 is a computing system diagram of the cloud desktop environment.
Figure 4:
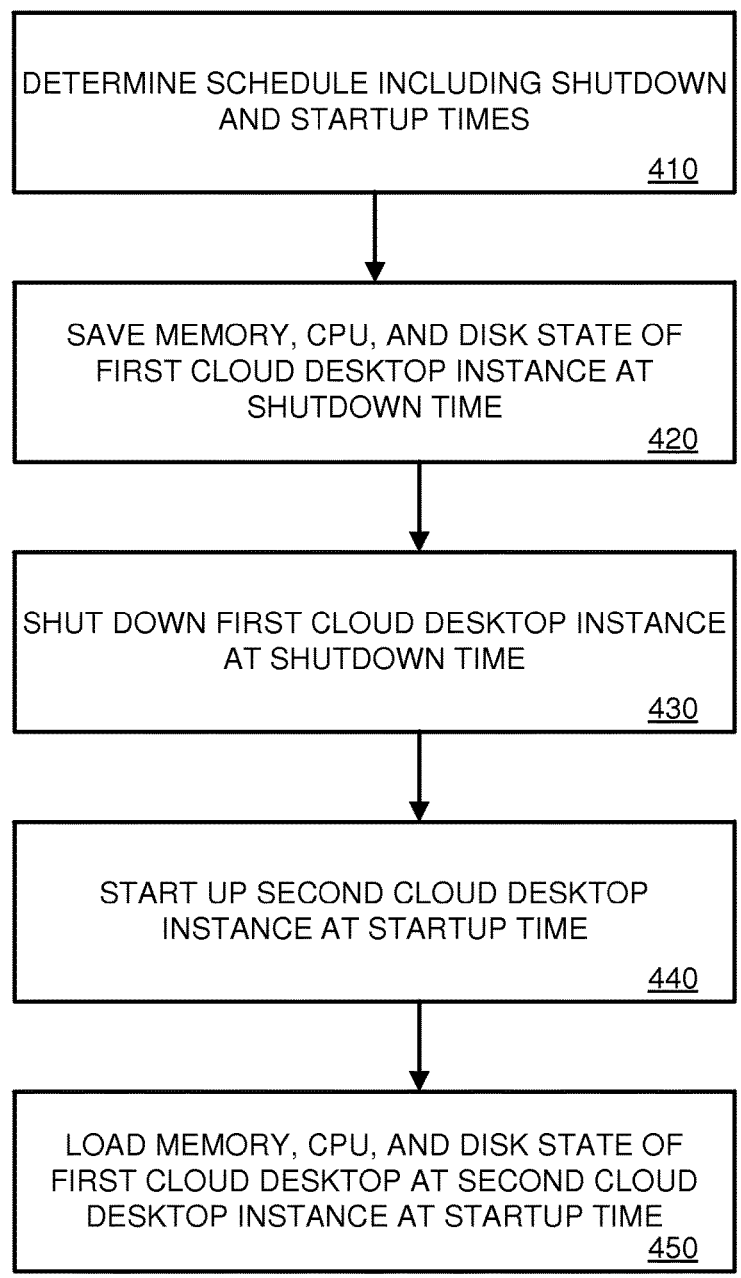
FIG. 4 is a flowchart showing another example method of scheduling a cloud desktop.

FIG. 3 is a computing system diagram of the cloud desktop environment and FIG. 4 is a flowchart showing another example method of scheduling a cloud desktop. At 410, a schedule is determined. The schedule may include, e.g., a shutdown time and a startup time. A scheduler 330 may be used to determine the schedule for the shutting down and starting up of a cloud desktop instance 325 running on the one or more cloud desktop servers 320.

At the shutdown time, at 420, the memory, CPU, and disk state of a first cloud desktop instance for the cloud desktop is saved, and, at 430, the first cloud desktop instance for the cloud desktop is shut down.

At the startup time, at 440, a second cloud desktop instance for the cloud desktop is started up, and, at 450, the saved memory, CPU, and disk state of the first cloud desktop instance is loaded for the second cloud desktop instance. Since the saved memory, CPU, and disk state are loaded at the second desktop instance, the second desktop instance may appear as the user left the cloud desktop, giving the appearance that the user is running the same cloud desktop instance.

For example, a user using a cloud desktop client application 315 on a user device 310, may set a time to shut down and startup the cloud desktop instance 325. The user may also, for example, leave work for the day and the scheduler 330 determines that the cloud desktop instance 325 should be shut down. Before the user returns to work, a second desktop instance may be started so the user's cloud desktop appears the same as when the user left work.

Figure 5:
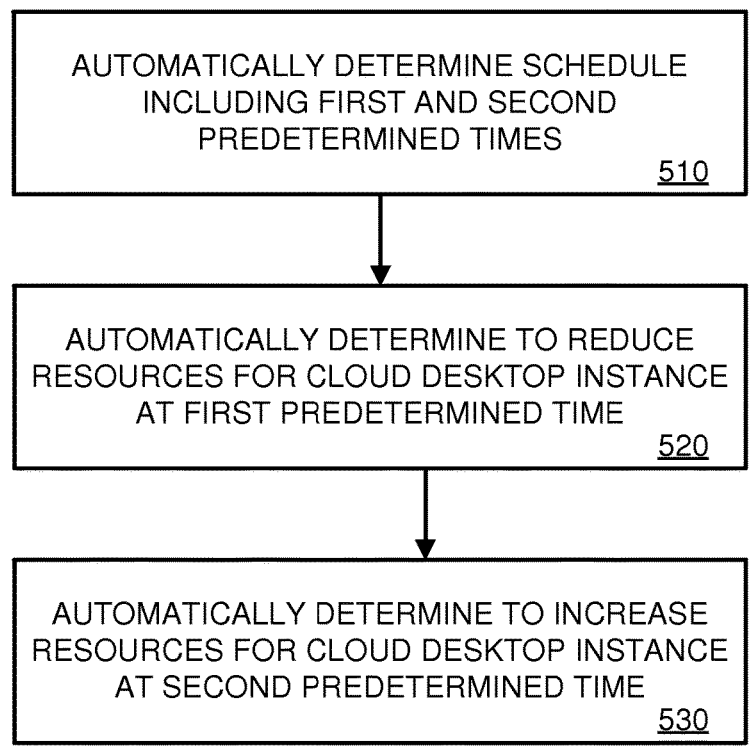
FIG. 5 is a flowchart showing another example method of scheduling a cloud desktop.

FIG. 5 is a flowchart showing another example method of scheduling a cloud desktop. At 510, a schedule is automatically determined. The schedule may include, e.g., a first predetermined time and a second predetermined time.

At 520, it may be determined to reduce computing resources for the cloud desktop instance at a first predetermined time. The computing resources may include network bandwidth, memory, central processing unit (CPU), and storage. For example, the memory allocated to the cloud desktop instance may be reduced. This allows the cloud computing server to reallocate the freed memory to other cloud desktop instances or other programs. The computing resources are not limited to the aforementioned list and may include any resources that may be allocated to a cloud desktop instance.

At 530, it may be determined to increase computing resources for the cloud desktop instance at a second predetermined time. For example, the memory allocated to the cloud desktop instance that was previously freed may be reallocated to its normal state. The cloud desktop instance may continue to run during the decreasing and increasing of computing resources allocated to the cloud desktop.

In some embodiments, a user may have a limited amount of computing resources allocated to their cloud desktop. A user may reduce the computing resources for a period of time to obtain credit for the reduced state of the cloud desktop instance. The user may use the credit to increase the computing resources at a normal or increased state of the cloud desktop instance for another period of time. Alternatively, the user may set up their schedule so that the total computing resources for a period of time does not exceed a resource threshold.

By decreasing and increasing computing resources, the cloud desktop servers can better allocate computing resources to the cloud desktop instances running at the server, since unused computing resources can be allocated to, for example, cloud desktop instances that need additional resources. This may benefit the user since, e.g., the user need only pay for computing resources that are actively being used. Another possible benefit is that the computing resources are being consumed more efficiently, where unused resources may be allocated to areas where they will be used.

Any of the examples described can be applied to other compute resource in the cloud, not just cloud desktops.

Cloud Computing Environment

Figure 6:
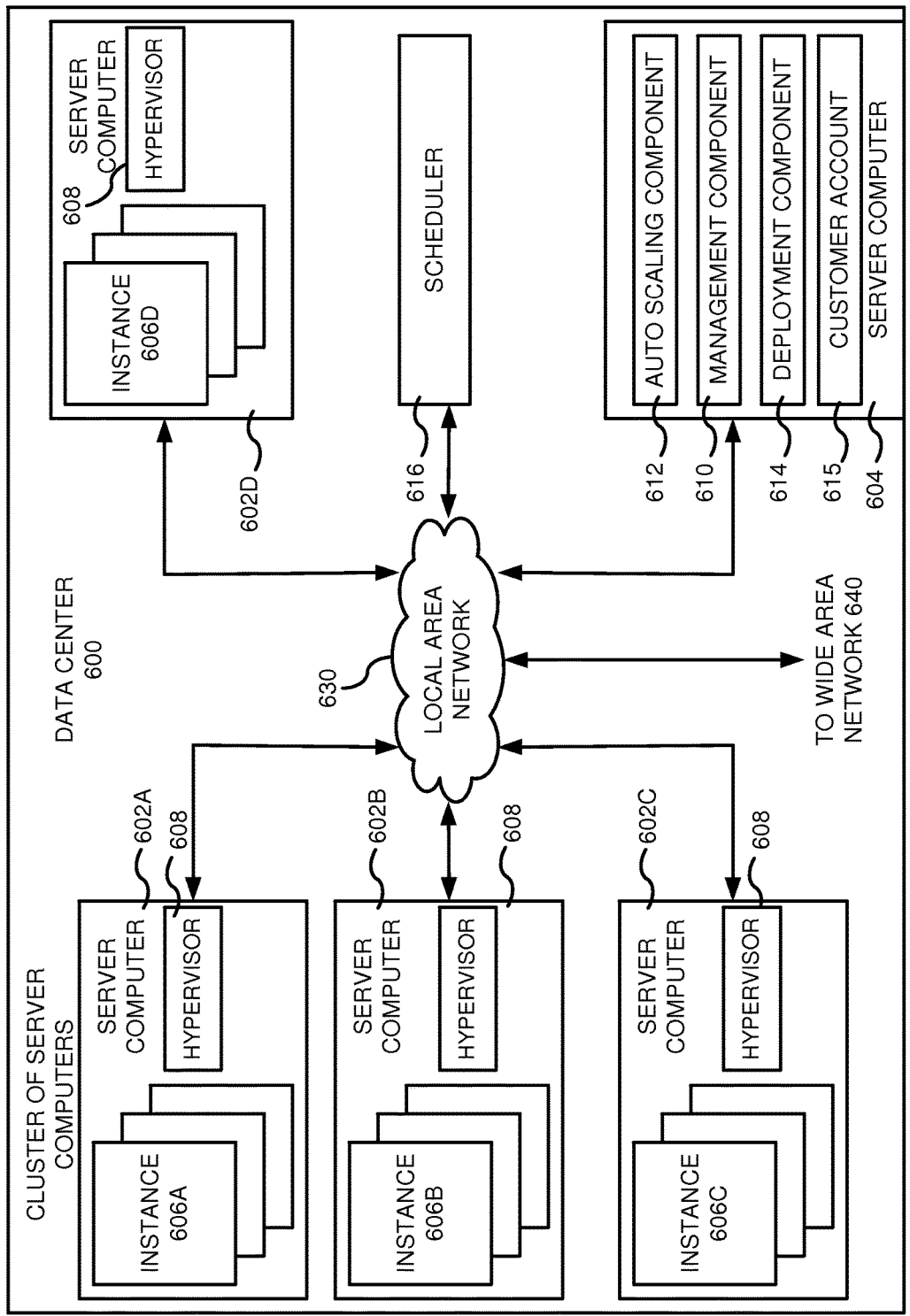
FIG. 6 is an example system diagram showing a plurality of virtual machine instances running in the multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A scheduler 616 may contain information on the startup and shutdown times for the users of the cloud desktop. The scheduler 616 may receive input from a user or an administrator of the cloud desktop, or may have logic or rules that determine the startup and shutdown times for instance of the cloud desktop. As shown in FIG. 6, the scheduler 616 is a separate component. However, it can be appreciated that the scheduler may be part of any of the server computers 602. Further, the scheduler 616 may be incorporated with other components (e.g., management component 614).

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
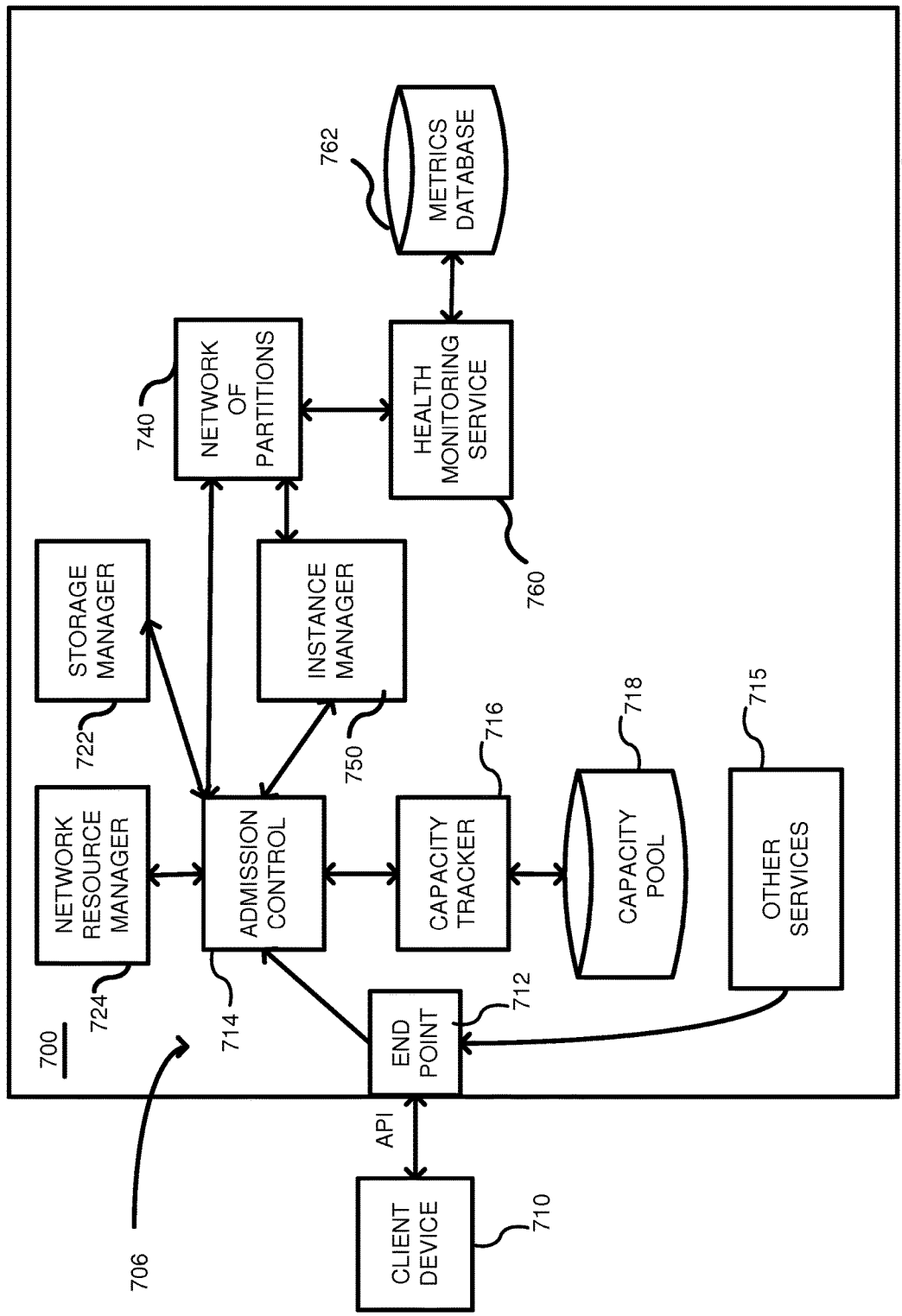
FIG. 7 shows further details of an example system including a plurality of management components associated with a control plane.

FIG. 7 illustrates in further detail management components 706 that can be used in the multi-tenant environment of the compute service provider. In order to access and utilize instances (such as instances 606 of FIG. 6), a client device 710 can be used. The client device 710 can be any of a variety of computing devices, mobile or otherwise including a cell phone, smartphone, handheld computer, Personal Digital Assistant (PDA), desktop computer, etc. The client device 710 can communicate with the compute service provider through an end point 712, which can be a DNS address designed to receive and process API requests. In particular, the end point 712 can be a web server configured to expose an API. Using the API requests, a client 710 can make requests to implement any of the functionality described herein. Other services 715, which can be internal to the compute service provider, can likewise make API requests to the end point 712.

Other general management services that may or may not be included in the compute service provider include an admission control 714, e.g., one or more computers operating together as an admission control web service. The admission control 714 can authenticate, validate and unpack the API requests for service or storage of data within the compute service provider. The capacity tracker 716 is responsible for determining how the servers need to be configured in order to meet the need for the different instance types by managing and configuring physical inventory in terms of forecasting, provisioning and real-time configuration and allocation of capacity. The capacity tracker 716 maintains a pool of available inventory in a capacity pool database 718. The capacity tracker 716 can also monitor capacity levels so as to know whether resources are readily available or limited. An instance manager 750 controls launching and termination of instances in the network. When an instruction is received (such as through an API request) to launch an instance, the instance manager pulls resources from the capacity pool 718 and launches the instance on a decided upon host server computer. Similar to the instance manager are the storage manager 722 and the network resource manager 724. The storage manager 722 relates to initiation and termination of storage volumes, while the network resource manager 724 relates to initiation and termination of routers, switches, subnets, etc. A network of partitions 740 is described further in relation to FIG. 8 and includes a physical layer upon which the instances are launched.

A health monitoring service 760 can provide monitoring for resources and the applications customers run on the compute service provider. System administrators can use the monitoring service 760 to collect and track metrics, and gain insight to how applications are running. For example, the monitoring service 760 can allow system-wide visibility into application performance and operational health. Metrics generated by the health monitoring service 760 can be stored in the metrics database 762.

Figure 8:
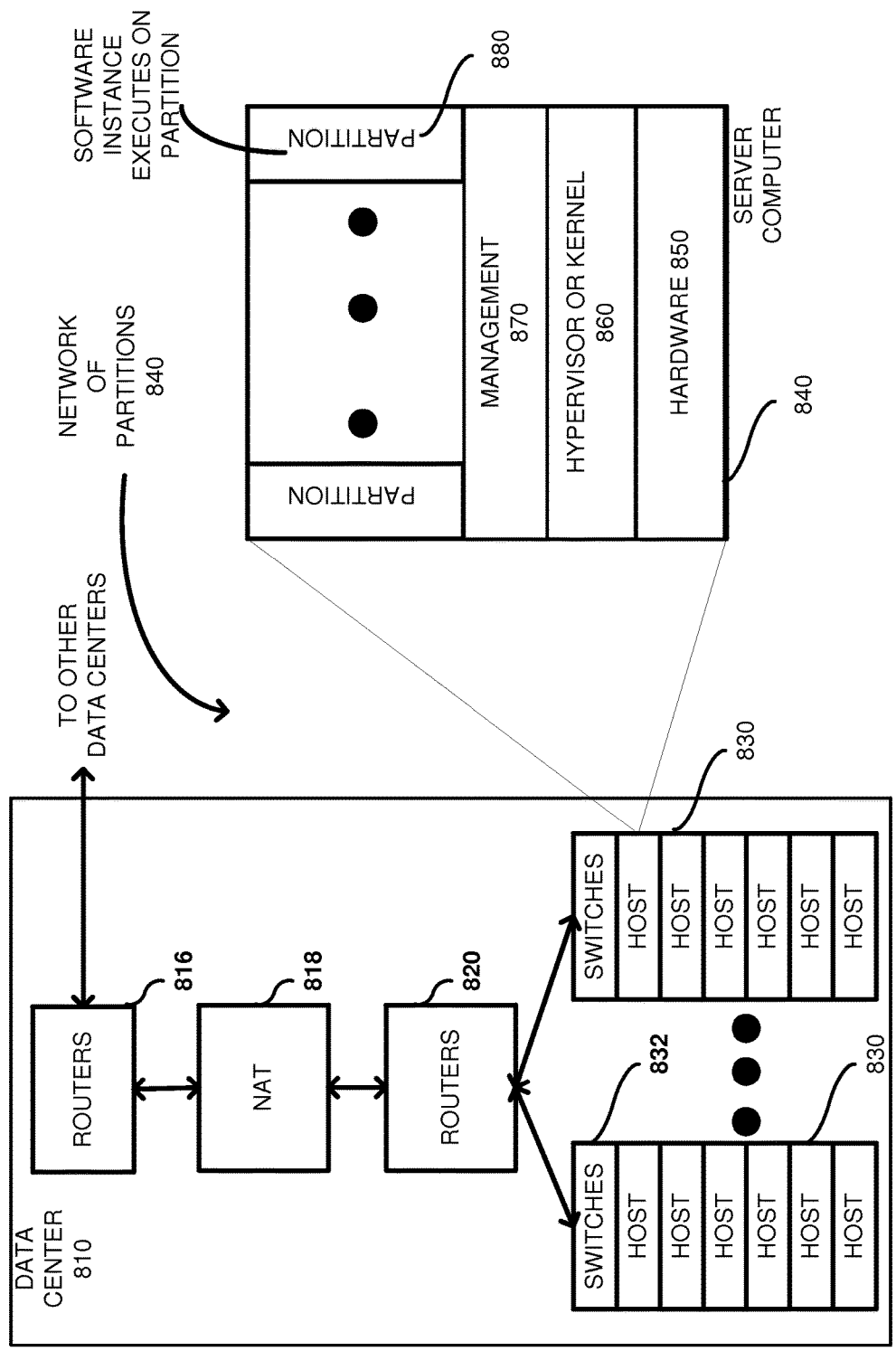
FIG. 8 shows an example of a plurality of host computers, routers and switches, which are hardware assets used for running virtual machine instances.

FIG. 8 illustrates the network of partitions 840 and the physical hardware associated therewith. The network of partitions 840 can include a plurality of data centers, such as data center 810, coupled together by routers 816. The routers 816 read address information in a received packet and determine the packet's destination. If the router decides that a different data center contains a host server computer, then the packet is forwarded to that data center. If the packet is addressed to a host in the data center 810, then it is passed to a network address translator (NAT) 818 that converts the packet's public IP address to a private IP address. The NAT also translates private addresses to public addresses that are bound outside of the datacenter 810. Additional routers 820 can be coupled to the NAT to route packets to one or more racks of host server computers 830. Each rack 830 can include a switch 832 coupled to multiple host server computers. A particular host server computer is shown in an expanded view at 840.

Each host 840 has underlying hardware 850 including one or more CPUs, memory, storage devices, etc. Running a layer above the hardware 850 is a hypervisor or kernel layer 860. The hypervisor or kernel layer can be classified as a type 1 or type 2 hypervisor. A type 1 hypervisor runs directly on the host hardware 850 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 870 can be part of the hypervisor or separated therefrom and generally includes device drivers needed for accessing the hardware 850. The partitions 880 are logical units of isolation by the hypervisor. Each partition 880 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 870, which can then pass the metrics to the health monitoring service 760 for storage in the metrics database 762. Additionally, the management layer 870 can pass to the monitoring service 750 the number of instances that are running, when they were launched, the operating system being used, the applications being run, etc. All such metrics can be used for consumption by the health monitoring service 760 and stored in database 762.

Cloud Desktop Environment

Figure 9:
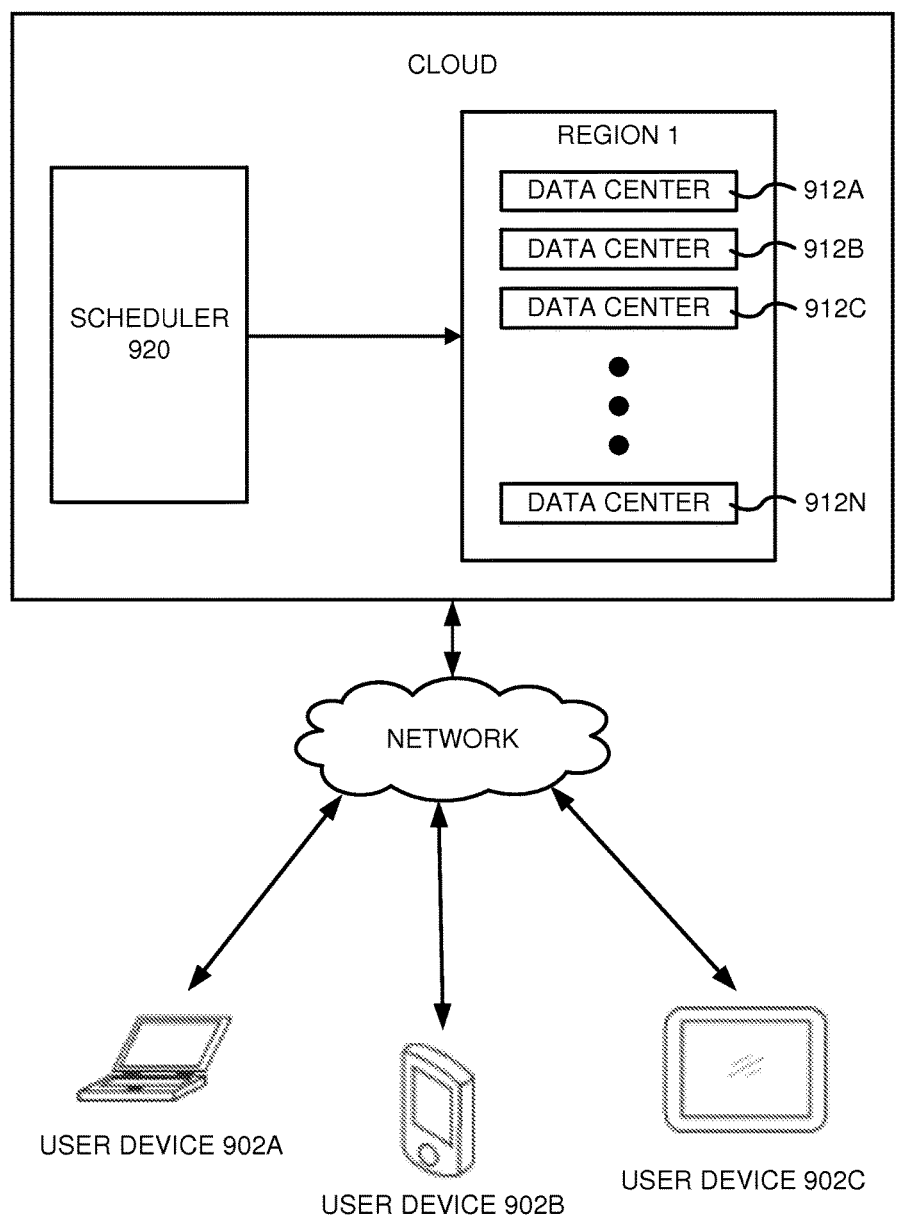
FIG. 9 is a diagram of a cloud desktop environment that can provide cloud desktop resources to various user devices.

FIG. 9 is a diagram of a cloud desktop environment that can provide cloud desktop resources to various user devices. The cloud desktop environment is not intended to suggest any limitation as to scope of use or functionality, as the innovations may be implemented in any type of computing device. For example, a computing can be any of a variety of computing devices (e.g., a server computer, desktop computer, laptop, tablet, mobile phone, or another type of computing device).

With reference to FIG. 9, the cloud desktop environment may include one or more user devices 902A, 902B, 902C. Each of the user devices 902A, 902B, and 902C may be in the same region or different regions. For example, a user device 902A may be used by a user in one region (e.g., office), and user devices 902B and 902C may be used by the user in a different region (e.g., on a business trip). The user may normally access their cloud desktop located in a region. The region may contain one or more data centers 912A-912N that host the cloud desktop associated with the user.

The scheduler 920 automatically determines a schedule for the cloud desktop. At the shutdown time, the scheduler may indicate to the one or more data centers 912A-912N that host the cloud desktop associated with the user that the user data should be saved and the cloud desktop instance should be shut down. At the startup time, the scheduler may indicate to the one or more data centers 912A-912N that host the cloud desktop associated with the user that a cloud desktop instance should be started up. The cloud desktop instance may be started up with the saved user data. Thus, the cloud desktop associated with the user is automatically shut down and started up on at least one of the data centers 912A-912N.

It should be understood that although the descriptions describe a cloud desktop being shut down and started up, any of the embodiments can also be applied to cloud-based services. For example, if it is determined that a cloud based service, such as a music streaming service or a database, should be shut down and started up, any of the described embodiments may be used to automatically shut down and started up the cloud desktop.

Example Computing Environment

Figure 10:
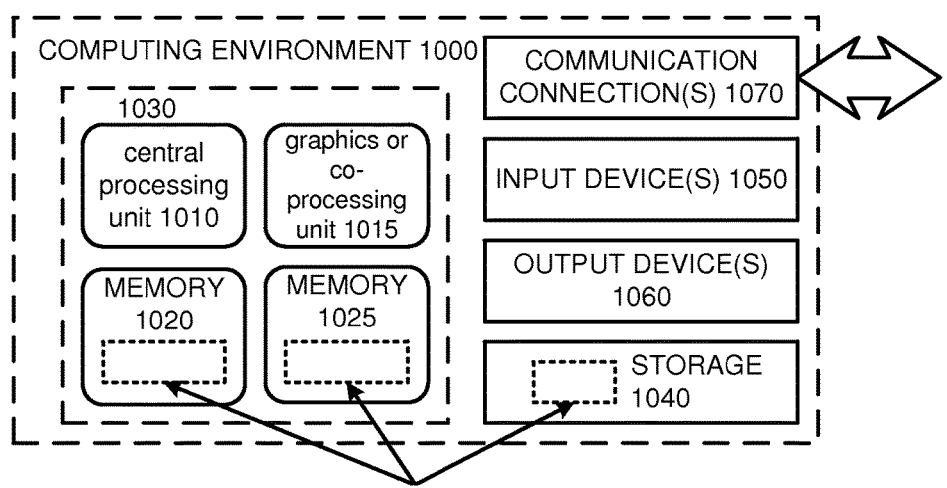
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope of these claims.

What is claimed is:

1. A method for scheduling a virtual desktop, comprising:
   determining a schedule, the schedule comprising a shutdown time and a startup time;
   at the shutdown time:
      saving user data for a first virtual desktop instance for the virtual desktop;
      shutting down the first virtual desktop instance; and
   at the startup time:
      starting up a second virtual desktop instance for the virtual desktop with the saved user data, wherein the shutdown and startup times for the virtual desktop are determined by a usage pattern of the virtual desktop, wherein the usage pattern is an application usage pattern;
   determining a schedule comprising a first predetermined time and a second predetermined time;
   at the first predetermined time, reducing computing resources for the second virtual desktop instance;
   at the second predetermined time, increasing computing resources for the second virtual desktop instance; and
   crediting a user for the reduced computing resources used by the second virtual desktop instance at the first predetermined time, wherein the credit reflects a difference between the reduced computing resources utilization and a resource threshold for the user, and wherein the credit is used to increase computing resources at the second predetermined time;
   wherein the first and second predetermined times are determined by the application usage pattern, wherein the application usage pattern is for a specific type of application running within the second virtual desktop instance.

2. The method of claim 1, wherein the user data is a user volume, and wherein starting a second virtual desktop instance comprises:
   obtaining a currently running desktop instance from a desktop pool; and
   attaching the user volume to the currently running desktop instance.

3. The method of claim 1, wherein starting a second virtual desktop instance comprises:
   loading an operating system and applications at the second virtual desktop instance; and
   loading the saved user data at the second virtual desktop instance.

4. The method of claim 1, wherein the shutdown and startup times are determined by an organizational policy.

5. The method of claim 1, wherein the shutdown and startup times are determined by calendar activities for a user associated with the virtual desktop.

6. A computer-readable storage medium including instructions thereon for executing a method for scheduling a virtual desktop, the method comprising:
   determining a schedule, the schedule comprising a shutdown time and a startup time;
   at the shutdown time:
      saving computer state data of a first virtual desktop instance for the virtual desktop;
      shutting down the first virtual desktop instance; and
   at the startup time:
      starting up a second virtual desktop instance; and
      loading the computer state data of the first virtual desktop instance at the second virtual desktop instance for the virtual desktop, wherein the shutdown and startup times for the virtual desktop are determined by a usage pattern of the virtual desktop, wherein the usage pattern is an application usage pattern;
   determining a second schedule comprising a first predetermined time and a second predetermined time;
   at the first predetermined time, reducing computing resources for the second virtual desktop instance;
   at the second predetermined time, increasing computing resources for the second virtual desktop instance; and
   crediting a user for the reduced computing resources used by the second virtual desktop instance at the first predetermined time, wherein the credit reflects a difference between the reduced computing resources utilization and a resource threshold for the user, and wherein the credit is used to increase computing resources at the second predetermined time;
   wherein the first and second predetermined times are determined by the application usage pattern, wherein the application usage pattern is for a specific type of application running within the second virtual desktop instance.

7. The computer-readable storage medium of claim 6, wherein the shutdown and startup times are specified by one of a user and an administrator associated with the virtual desktop.

8. The computer-readable storage medium of claim 6, wherein the shutdown and startup times are determined by an organizational policy.

9. The computer-readable storage medium of claim 6, wherein the usage pattern is for a single user associated with the virtual desktop.

10. The computer-readable storage medium of claim 6, wherein the usage pattern is for an aggregate of a group of users.

11. The computer-readable storage medium of claim 6, wherein the shutdown time is determined by an inactivity timer.

12. The computer-readable storage medium of claim 6, wherein the computer state data comprises memory, central processing unit (CPU), and disk state of the first virtual desktop instance.

13. A system comprising:
 one or more computers including processors and memory, the memory including instructions that, upon execution, cause the one or more computers to:
  set a startup time to start up a virtual desktop instance of a virtual desktop by a time a user reaches a user computing device, the startup time based at least in part on the user associated with the virtual desktop approaching a geographical location;
  start up the virtual desktop instance at the startup time;
  determine a schedule, the schedule comprising a first predetermined time and a second predetermined time;
  at the first predetermined time:
   determine to reduce computing resources for the virtual desktop instance at the first predetermined time;
  at the second predetermined time:
   determine to increase computing resources for the virtual desktop instance; and
   credit the user for the reduced computing resources used by the virtual desktop instance at the first predetermined time, wherein the credit reflects a difference between the reduced computing resources utilization and a resource threshold for the user, and wherein the credit is used to increase computing resources at the second predetermined time;
  wherein the first and second predetermined times are determined by an application usage pattern of the user associated with the virtual desktop, wherein the application usage pattern is for a specific type of application running within the virtual desktop instance.

14. The system of claim 13, wherein a virtual desktop instance continues to run during the reducing and increasing of computing resources.

15. The system of claim 13, wherein the computing resources comprises at least one of network bandwidth, memory, central processing unit (CPU), graphics processing unit (GPU), or storage.

16. The system of claim 13, wherein the first and second predetermined times are determined by an organizational policy.

17. The system of claim 13, wherein computing resources for the virtual desktop instance are decreased at the first predetermined time and increased at the second predetermined time based at least in part on the application usage pattern.

18. The system of claim 13, wherein the first predetermined time is determined by an inactivity timer.

\* \* \* \* \*